US011919309B2

(12) United States Patent
Narazaki et al.

(10) Patent No.: US 11,919,309 B2
(45) Date of Patent: Mar. 5, 2024

(54) LIQUID DISCHARGE APPARATUS, CONTROL METHOD, AND COMPUTER-READABLE STORAGE MEDIUM

(71) Applicant: CANON KABUSHIKI KAISHA, Tokyo (JP)

(72) Inventors: Tetsuya Narazaki, Tokyo (JP); Kei Kosaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/493,724

(22) Filed: Oct. 4, 2021

(65) Prior Publication Data

US 2022/0111651 A1 Apr. 14, 2022

(30) Foreign Application Priority Data

Oct. 13, 2020 (JP) ................................ 2020-172712

(51) Int. Cl.
*B41J 2/165* (2006.01)

(52) U.S. Cl.
CPC ................................ *B41J 2/16517* (2013.01)

(58) Field of Classification Search
CPC .......................... B41J 2/16517; B41J 2/16523
See application file for complete search history.

(56) References Cited

U.S. PATENT DOCUMENTS

| | | | | |
|---|---|---|---|---|
| 9,108,410 | B2 | 8/2015 | Hamasaki et al. | B41J 11/008 |
| 9,446,595 | B2 | 9/2016 | Takarabe et al. | B41J 2/1652 |
| 9,517,628 | B2 | 12/2016 | Tenkawa et al. | B41J 2/17566 |
| 10,207,506 | B2 | 2/2019 | Iwasaki et al. | B41J 2/16508 |
| 11,192,379 | B2 | 12/2021 | Narazaki et al. | B41J 2/17509 |
| 2019/0193405 | A1 * | 6/2019 | Suzuki | B41J 2/16523 |
| 2020/0316936 | A1 | 10/2020 | Yaita et al. | B41J 2/04563 |

FOREIGN PATENT DOCUMENTS

JP 2007-098777 4/2007

OTHER PUBLICATIONS

U.S. Appl. No. 17/495,653, filed Oct. 6, 2021.

* cited by examiner

*Primary Examiner* — Sharon Polk
(74) *Attorney, Agent, or Firm* — Venable LLP

(57) ABSTRACT

There is provided a liquid discharge apparatus comprising: a discharge unit for performing recording processing in which a liquid is discharged onto a recording medium; a waste liquid containing unit for containing a waste liquid; a mount unit to which the waste liquid containing unit is mounted; a detection unit for detecting whether the waste liquid containing unit is mounted; and a control unit for controlling a discharge operation of a liquid from the discharge unit, wherein if the detection unit detects that the waste liquid containing unit is not mounted, the control unit controls not to perform the discharge operation, and the control unit performs a first recovery operation for restoring the discharge unit after the detection unit has detected that the waste liquid containing unit is not mounted, and before the next execution of the recording processing.

9 Claims, 8 Drawing Sheets

LIQUID DISCHARGE APPARATUS, CONTROL METHOD, AND COMPUTER-READABLE STORAGE MEDIUM

BACKGROUND OF THE INVENTION

Field of the Invention

The present invention relates to a liquid discharge apparatus, a control method, and a computer-readable storage medium.

Description of the Related Art

Conventionally, apparatuses in which a waste liquid containing unit can be inserted/removed are widely known as a type of inkjet recording apparatuses. Japanese Patent Laid-Open No. 2007-98777 discloses that when a waste liquid containing unit is removed while recording processing or recovery processing is being executed in an inkjet recording apparatus in which a waste liquid containing unit can be inserted/removed, these operations are suspended.

In the above conventional technique, when the waste liquid containing unit is drawn out during the execution of the recording processing, the operation is suspended, and then the suspended recording processing is resumed when the waste liquid containing unit is inserted again. Therefore, when the operation is suspended while a cap for sealing a recording head is open, an ink discharge nozzle provided in the recording head is exposed to the air. For this reason, solidification of ink adhered to the ink discharge nozzle or the like may occur, and even if the operation is resumed, the operation that has been suspended may fail due to a printing failure or the like.

SUMMARY OF THE INVENTION

The present invention was conceived in view of the above described problems, and aims to prevent a discharging failure from occurring in recording processing due to insertion/removal of a waste liquid containing unit.

In order to solve the above-described problem, one aspect of the liquid discharge apparatus according to the present invention comprises: a discharge unit configured to perform recording processing in which a liquid is discharged onto a recording medium; a waste liquid containing unit configured to contain a waste liquid of the liquid; a mount unit configured such that the waste liquid containing unit is mounted to be freely attached/detached; a detection unit configured to detect whether or not the waste liquid containing unit is mounted to the mount unit; and a control unit configured to control a discharge operation of a liquid from the discharge unit, wherein in a case where the detection unit detects that the waste liquid containing unit is not mounted to the mount unit, the control unit controls so as not to perform the discharge operation, and the control unit performs a first recovery operation for restoring the discharge unit after the detection unit has detected that the waste liquid containing unit is not mounted to the mount unit, and before the next execution of the recording processing.

Further features of the present invention will become apparent from the following description of exemplary embodiments (with reference to the attached drawings).

DESCRIPTION OF THE EMBODIMENTS

Figure 1:
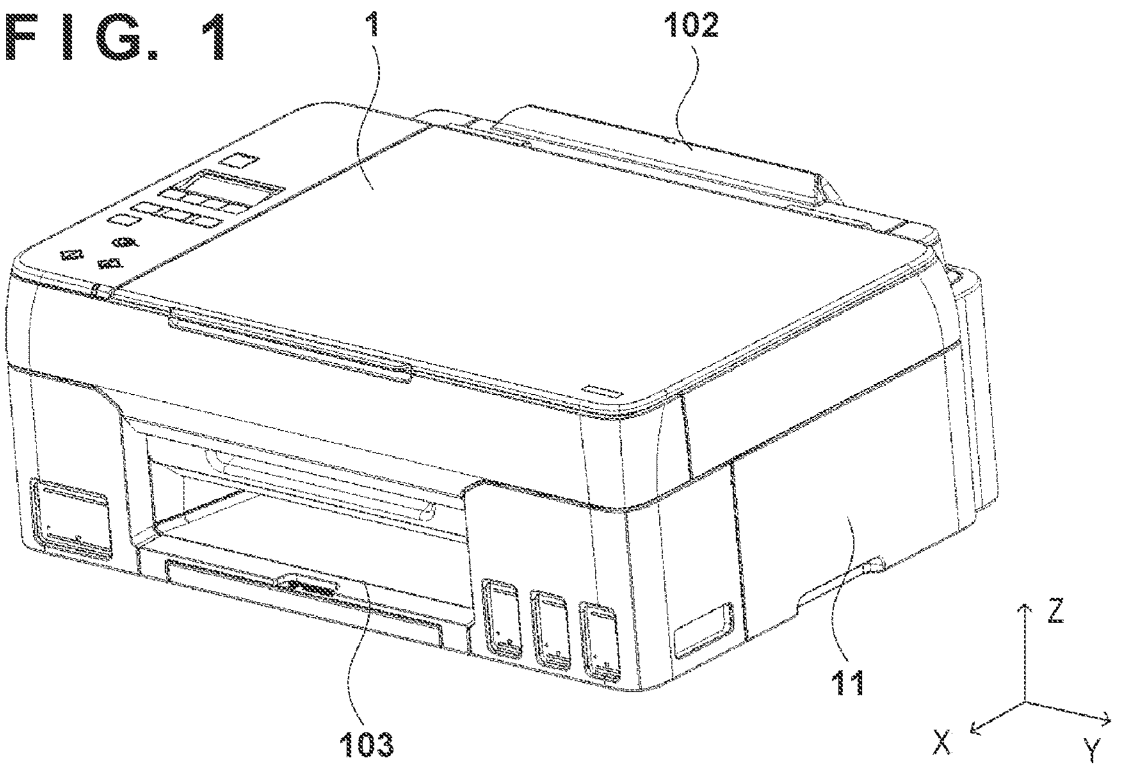
FIG. 1 is a perspective view illustrating an overview of a recording apparatus according to an embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

Figure 2:
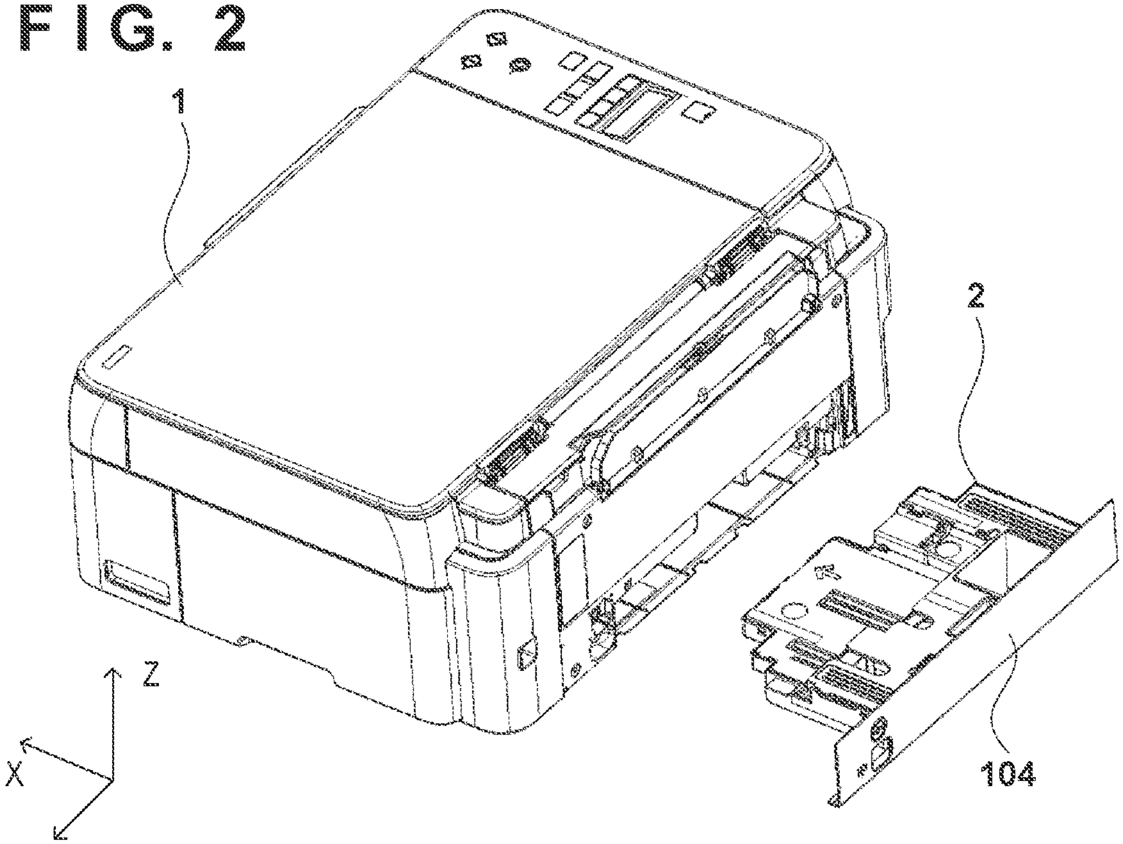
FIG. 2 is a back perspective view illustrating an overview of the recording apparatus according to the embodiment.

FIGS. 1 and 2 are a perspective view and a rear view illustrating an overview of an inkjet recording apparatus 1 (hereinafter, recording apparatus 1) according to the first embodiment. The recording apparatus 1 includes a housing 11 and a waste liquid containing unit 2 illustrated in FIG. 2. The waste liquid containing unit 2 is fixed to be freely attached/detached by a waste liquid containing unit cover 104, which is a part of the housing 11, and the waste liquid containing unit cover 104 needs to be detached when detaching the waste liquid containing unit 2. The waste liquid containing unit cover 104 is mounted on the housing 11 by engaging with an engagement structure that the housing 11 comprises and is structured so as not to be easily detached from the housing 11 unless a user intentionally detaches the waste liquid containing unit cover 104. That is, the waste liquid containing unit cover 104 operates as a mount unit for connecting the waste liquid containing unit 2 to a waste ink discharging channel.

Figure 3:
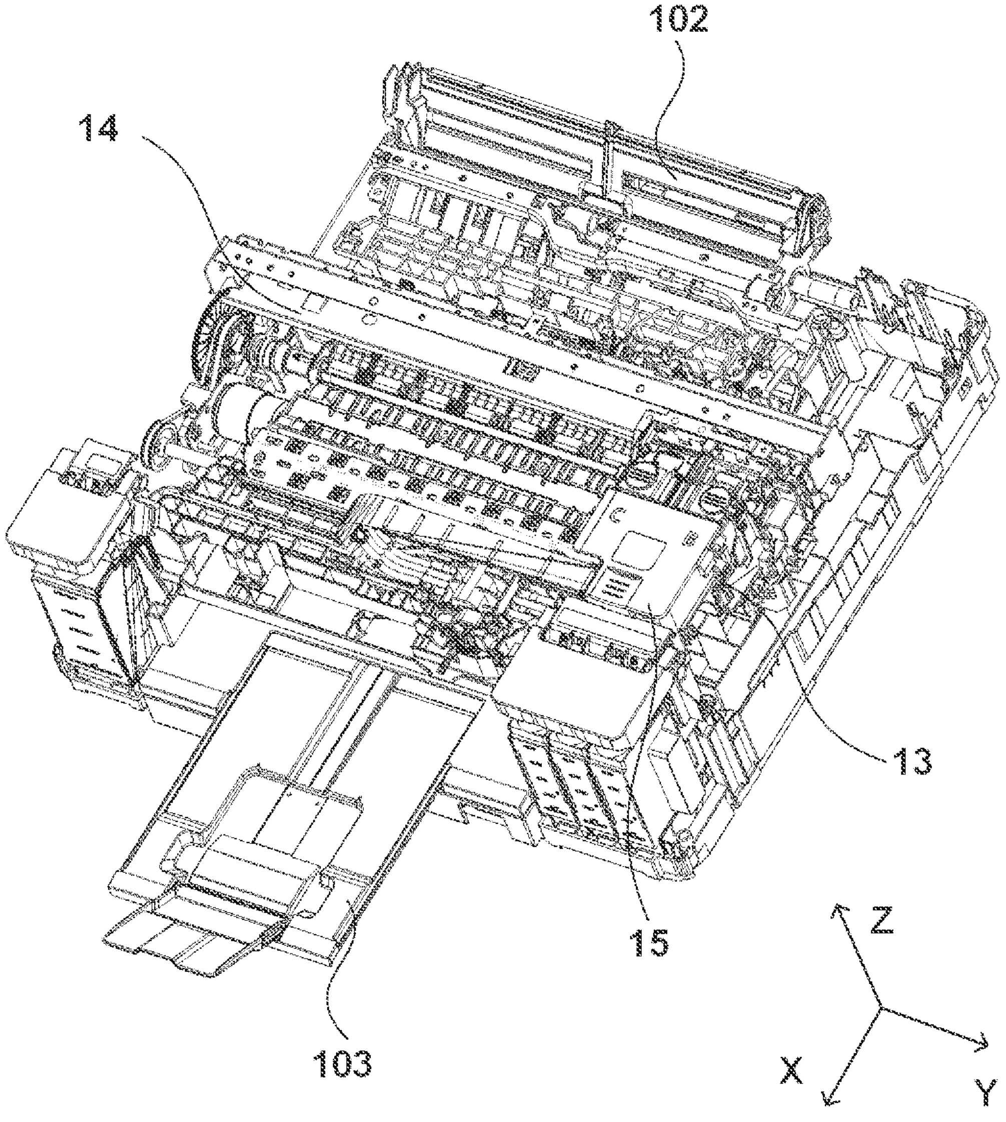
FIG. 3 is a schematic view illustrating an internal structure of the recording apparatus according to the embodiment.

FIG. 3 illustrates the structure inside the body. The inside of the main body includes a recording head 13 by which ink discharge is performed, a carriage 15, and a guide 14 for the carriage 15 to operate. When recording is performed on a sheet-like recording medium in the recording apparatus 1, the recording medium is supplied from a sheet feeding unit 102, and a recorded product is generated as the carriage 15 moves along the guide 14, discharging ink from the recording head 13. The recorded product on which the recording has been completed is discharged to a sheet discharge unit 103. In this specification, the recording apparatus 1 is also referred to as a liquid discharge apparatus.

Figure 4:
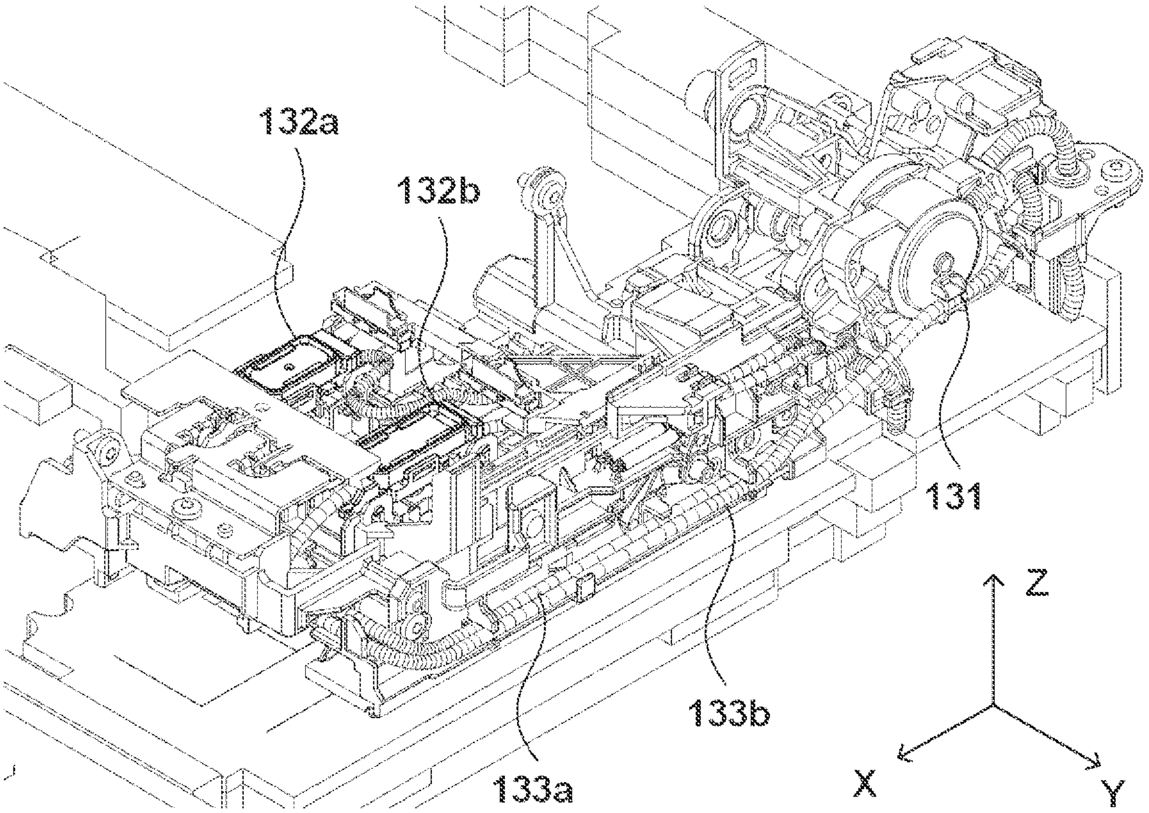
FIG. 4 is a perspective view illustrating an overview of a recovery unit according to the embodiment.

FIG. 4 is a perspective view schematically illustrating a recovery unit. In the present embodiment, the recording apparatus 1 has a recovery unit for maintaining or restoring the discharge performance (recording performance) of the recording head 13. The recovery unit includes suction caps 132*a* and 132*b* capable of switching between whether or not to cover (whether or not to cap) the recording head 13, and a suction pump 131 for suctioning ink in the suction caps 132*a* and 132*b*. Note that when the suction caps 132*a* and 132*b* are collectively referred to or are not distinguished from each other, they are referred to as suction cap(s) 132. The suction pump 131 is an example of a suction unit that suctions the ink in the recording head 13 and the suction caps 132 via suction tubes 133*a* and 133*b* to which it is connected. When the suction tube 133*a* and 133*b* are collectively referred to or are not distinguished from each other, they are referred to as suction tube(s) 133. The suction caps 132, the suction tubes 133, and the suction pump 131 are examples of introducing members for introducing the waste liquid (waste ink) discharged from the recording head 13 into the waste liquid containing unit 2. The waste liquid suctioned here is sent to the waste liquid containing unit 2 via the suction pump 131.

Figure 5:
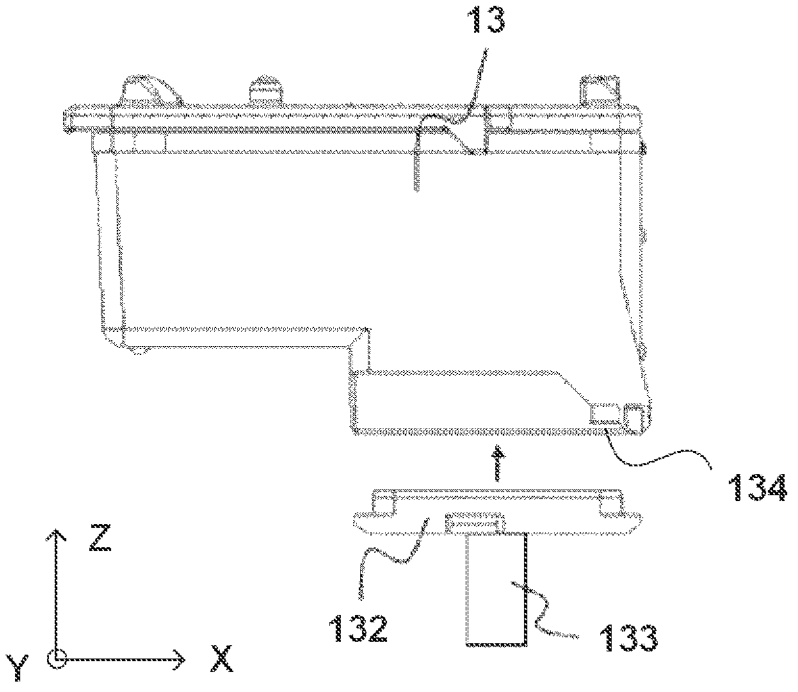
FIG. 5 is a view schematically illustrating a recording head and a suction cap according to the embodiment.

FIG. 5 is a schematic view of the recording head 13. The recording head 13 is an example of a discharge unit having a discharge surface 134 for discharging ink. There are many very small ink discharge ports on the discharge surface 134, and when they are exposed to air for a long time, there is a possibility that the ink inside the discharge ports may evaporate and coagulate, and it may not be possible for normal discharge to be performed at the time of printing. Therefore, in order to maintain a high humidity of the discharge surface 134, the suction caps 132 are connected to the recording head 13 so as to cover the discharge surface 134. A state in which a suction cap 132 covers the discharge surface 134 is referred to as a cap closed state, and a state in which the suction cap 132 does not cover the discharge surface 134 is referred to as a cap open state.

Figure 6:
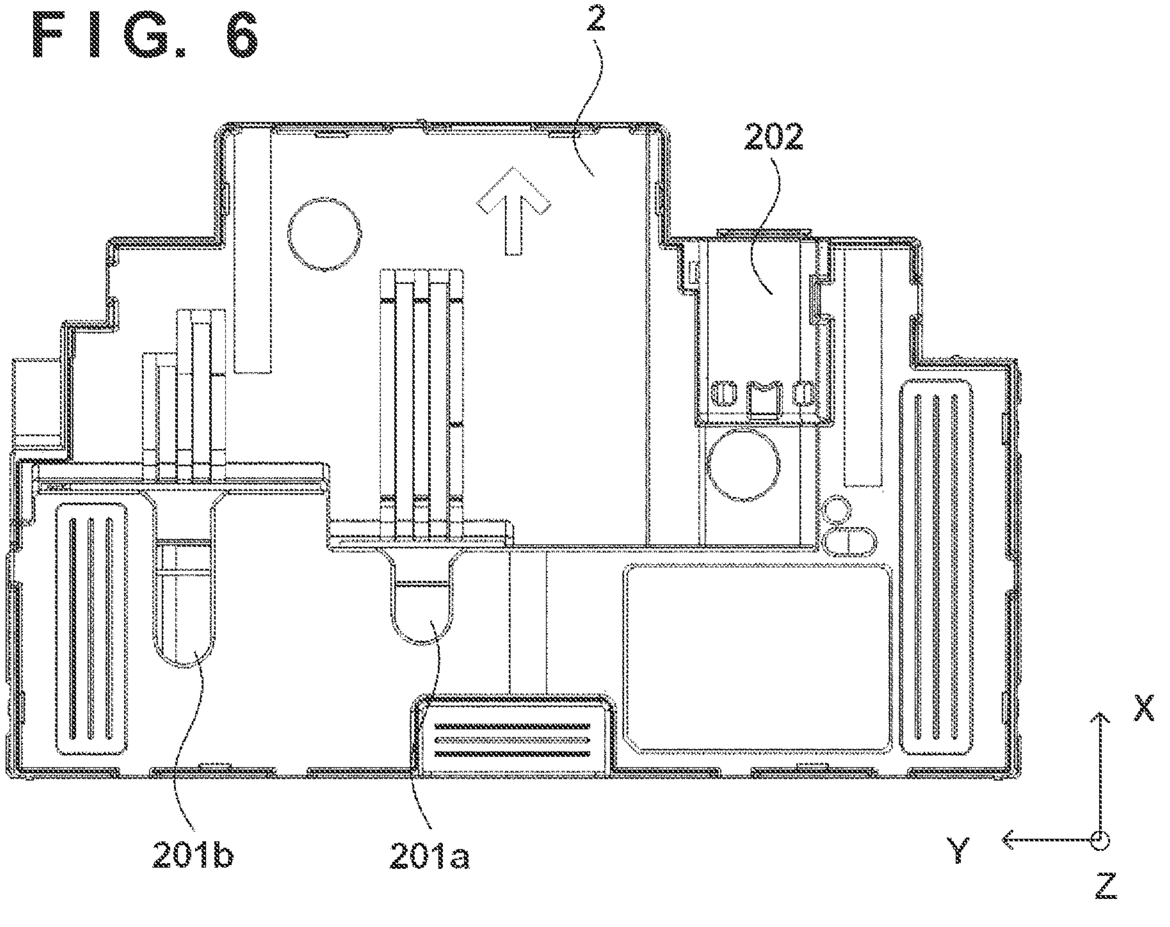
FIG. 6 is a schematic view illustrating a waste liquid containing unit of the recording apparatus according to the embodiment.

FIG. 6 is a schematic view of the waste liquid containing unit 2. The waste liquid made to flow from the suction caps 132 via the suction tubes 133 by the suction pump 131 continues into waste liquid ports 201*a* and 201*b* of the waste liquid containing unit 2 and is stored in the waste liquid containing unit 2. When the waste liquid ports 201*a* and 201*b* are collectively referred to or are not distinguished from each other, they are referred to as waste liquid port(s) 201. The waste liquid containing unit 2 has a connection terminal 202 and is electrically connected to the recording apparatus 1 via the connection terminal 202 when mounted to the recording apparatus 1. As a result, the recording apparatus 1 can detect that the waste liquid containing unit 2 has been mounted.

Figure 7:
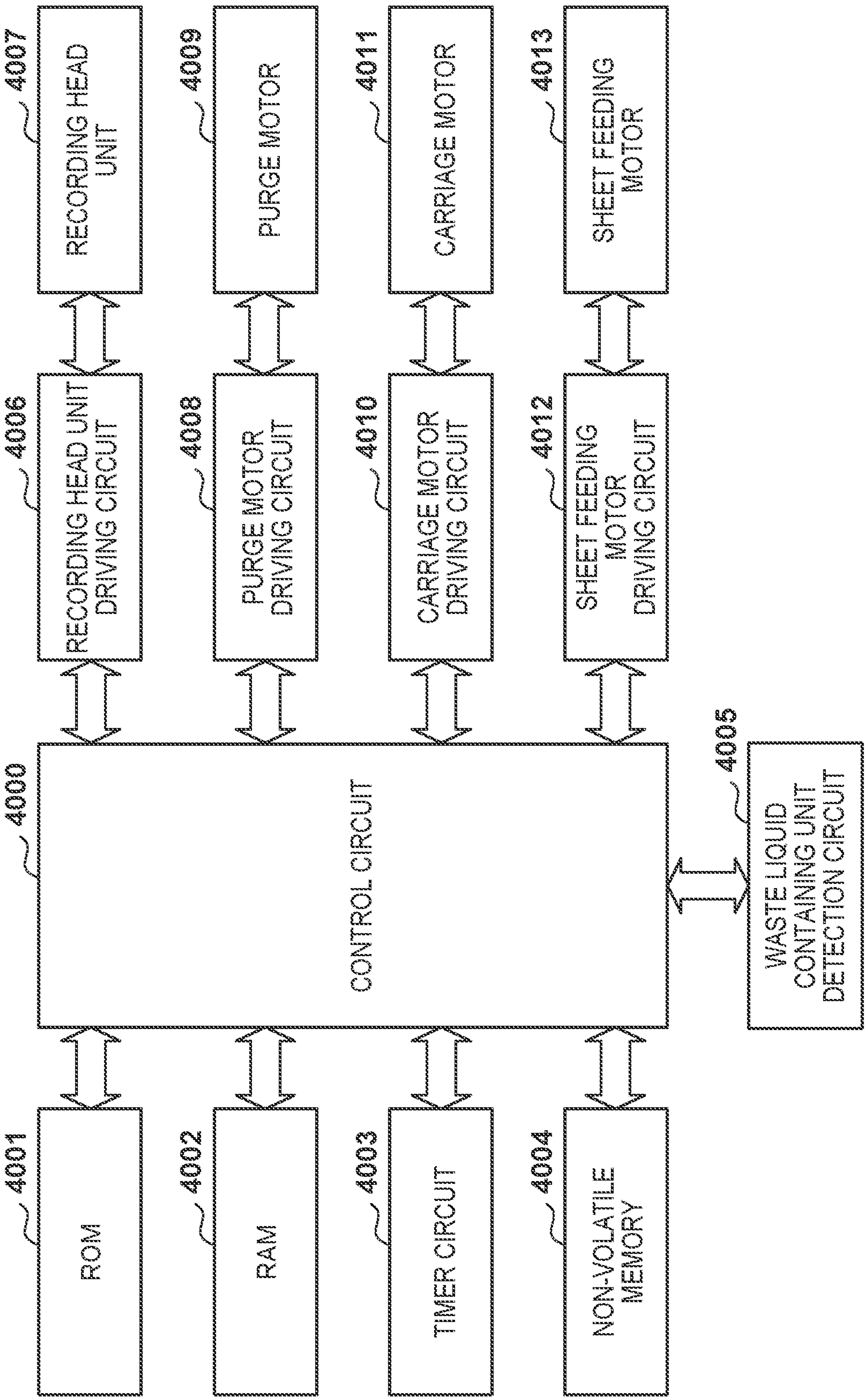
FIG. 7 is a block diagram of a control of a main body according to one embodiment.

FIG. 7 is a block diagram illustrating a configuration of a control unit of the recording apparatus 1. A ROM 4001 stores a control program that a control circuit 4000 executes and each setting value used by the control program. The control circuit 4000 expands and executes in a RAM 4002 the program and the set values stored in the ROM 4001 and performs storage of print data (record data) and a control instruction, and storage of control variables in each control. A timer circuit 4003 is a circuit capable of acquiring the current time or a circuit capable of measuring elapsed time. A non-volatile memory 4004 is a storage unit capable of storing a parameter that has been stored by a control even in a state in which the power of the main body is turned off. The non-volatile memory 4004 according to the present embodiment is also used for writing and reading a time, which serves as a starting point when the control circuit 4000 calculates elapsed time.

A waste liquid containing unit detection circuit 4005 is an example of a detection unit that detects whether the recording apparatus 1 and the waste liquid containing unit 2 are connected to each other. It detects whether the waste liquid containing unit 2 is mounted on the main body via the connection terminal 202 of the waste liquid containing unit 2. In one example, the waste liquid containing unit detection circuit 4005 may communicate not only the detection of whether or not the recording apparatus 1 and the waste liquid containing unit 2 are connected to each other, but also information indicating how much waste liquid is contained in the waste liquid containing unit 2.

The control circuit 4000 expands the received image data in the RAM 4002. Further, the control circuit 4000 controls the driving of a recording head unit 4007 via a recording head unit driving circuit 4006 based on the data on the RAM 4002 and simultaneously controls a carriage motor 4011 via a carriage motor driving circuit 4010. In addition to the control by the control circuit 4000 described above, one instance of a recording scan is executed by causing the recording head 13 to discharge ink at a desired position on the recording medium. Also, the control circuit 4000 conveys the recording medium by a desired amount by controlling a sheet feeding motor 4013 via a sheet feeding motor driving circuit 4012. The recording processing is performed by repeating this.

In the recovery operation to be described later, the control circuit 4000 controls a purge motor 4009 via a purge motor driving circuit 4008 and suctions a predetermined amount of ink from a suction cap 132 and the recording head 13. Further, in the ink discharge performed on the suction cap 132, the control circuit 4000 causes the recording head 13 to discharge a predetermined amount of ink by controlling the driving of the recording head unit 4007 via the recording head unit driving circuit 4006. In this instance, the pattern for driving the recording head 13 is, similarly to the above-described recording operation, based on any of the data developed in the RAM 4002, the data in the ROM 4001, or the data generated by the control circuit 4000.

Here, the inkjet recording apparatus performs a recovery operation of the recording head, such as ink suction, for the purpose of removing bubbles in the recording head, discharging solidified ink, filling ink, and the like. As a case where the recovery operation is required, there is a case where the recording head 13 is left in the cap open state due to an abnormal termination of the recording processing or the recovery processing. In addition, the recovery operation is also required when the ink tank is replaced, when a predetermined time has elapsed since the previous recovery processing was performed, and when the amount (the number of dots) of ink discharge it has taken for the recording processing since the previous recovery operation was performed becomes a predetermined value or more. In such a case, the control circuit 4000 stores a recovery flag in the non-volatile memory 4004 of FIG. 6 and sets the recording apparatus 1 to perform the recovery operation. When the recovery flag is stored so as to perform the recovery operation, the control circuit 4000 performs the recovery operation at a predetermined timing.

The recording apparatus 1 according to the present embodiment is set so as to store a recovery flag when the waste liquid containing unit 2 is not mounted on the recording apparatus 1 and then perform a recovery operation. The processing that by the control circuit 4000 executes will be described below.

(Processing of Detecting the Waste Liquid Containing Unit)

Figure 8A:
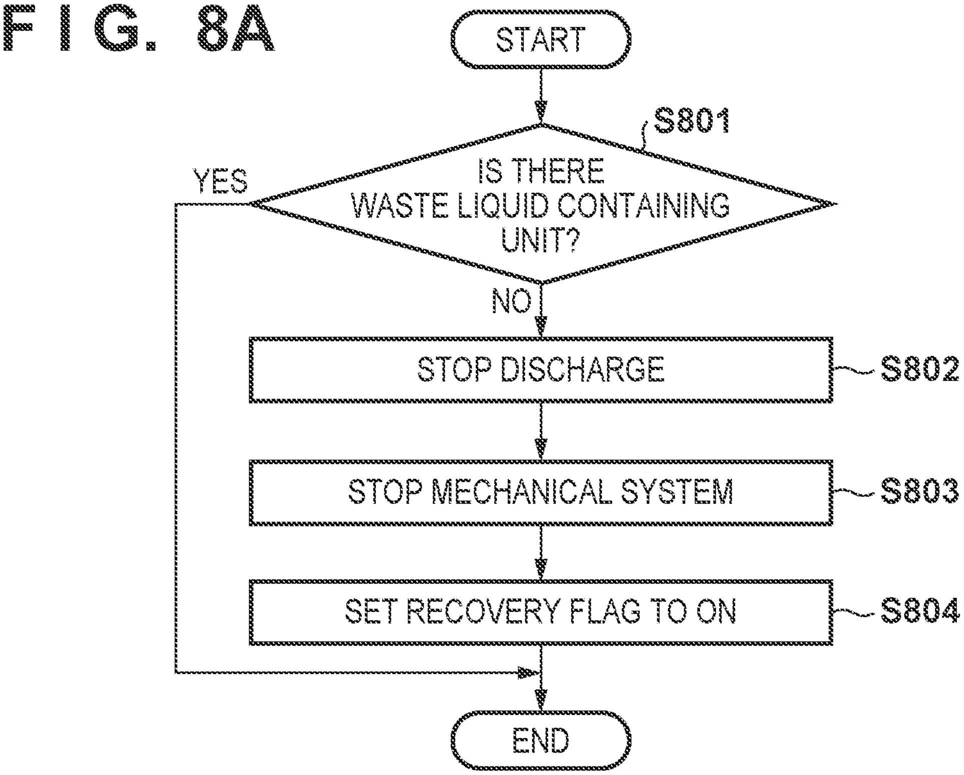
FIGS. 8A and 8B are flowcharts illustrating examples of processing of a CPU in printing processing according to the embodiment.
Figure 8B:
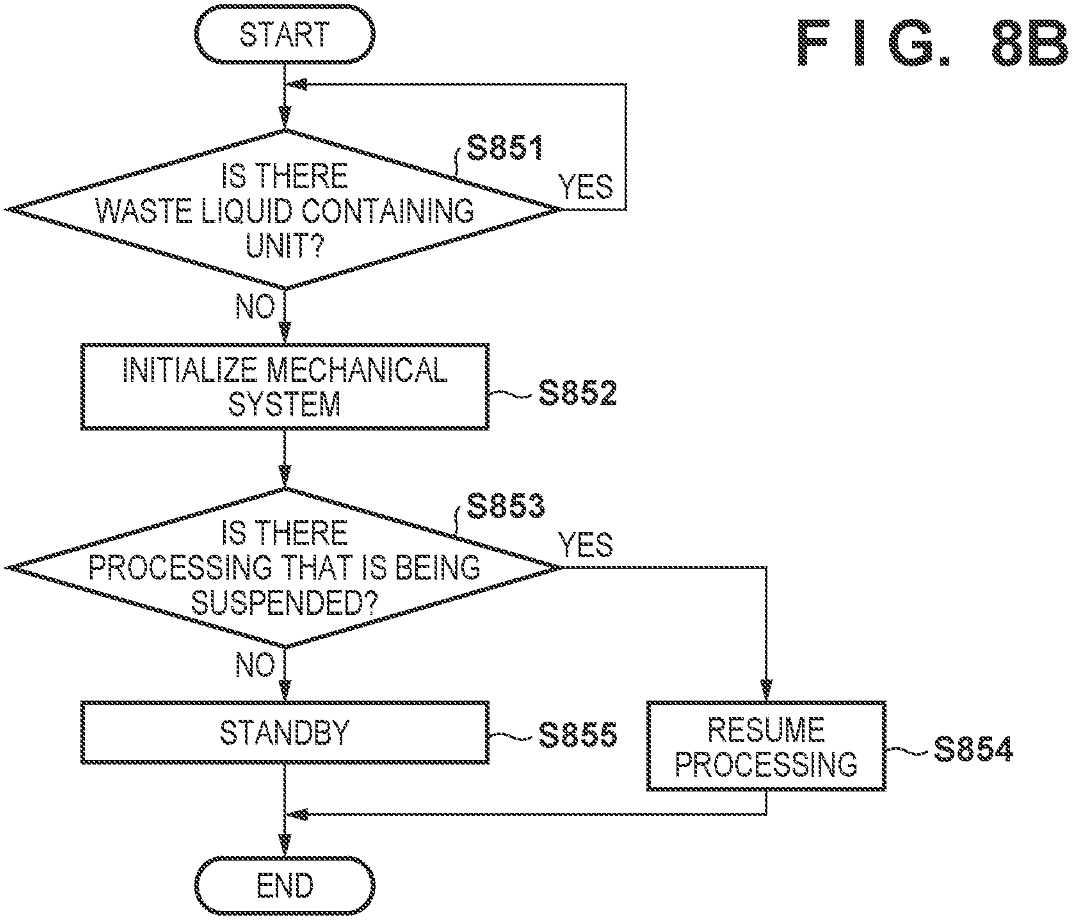

The processing in which the control circuit 4000 detects the presence or absence of the waste liquid containing unit 2 will be described with reference to FIG. 8A and FIG. 8B. FIG. 8A and FIG. 8B are realized by the control circuit 4000 deploying and executing in the RAM 4002 a program stored in the ROM 4001 or the non-volatile memory 4004.

FIG. 8A is processing of suspending the processing that is being executed in accordance with the presence or absence of the waste liquid containing unit 2. In the present embodiment, the recording apparatus 1 executes the detection processing illustrated in FIG. 8A at predetermined time intervals while the recording processing and the recovery processing to be described later are being executed, and determines whether or not the waste liquid containing unit 2 is mounted on the recording apparatus 1.

First, the control circuit 4000 determines whether or not the waste liquid containing unit 2 is mounted to the recording apparatus 1 (step S801). When the waste liquid containing unit 2 is mounted to the recording apparatus 1 (Yes in step S801), the control circuit 4000 ends the processing illustrated in FIG. 8A. On the other hand, when the waste liquid containing unit 2 is not mounted to the recording apparatus 1 (No in step S801), the control circuit 4000 controls the recording head 13 and causes the recording head 13 to stop preliminary discharge (step S802). Subsequently, the control circuit 4000 controls so as to cause the operation of a mechanical system, which includes at least one of the recording head unit 4007, the purge motor 4009, the carriage motor 4011, the sheet feeding motor 4013, and the suction pump 131, to be stopped (step S803). Then, a recovery flag is set to on (step S804) so that the recording apparatus 1 performs the recovery operation when it is detected that the waste liquid containing unit 2 has been mounted on the recording apparatus 1, and the processing of FIG. 8A is finished. This makes it possible to prevent the recording head 13 from discharging ink when the waste liquid containing unit 2 is not mounted on the recording apparatus 1 and scattering the waste liquid (waste ink) in the recording apparatus 1. Note that the recovery flag set in step S804 may include not only on or off but also information specifying the recovery operation to be performed.

Next, FIG. 8B is processing of resuming suspended processing in accordance with the presence or absence of the waste liquid containing unit 2. In the present embodiment, this is executed in response to the determination that the waste liquid containing unit 2 is not mounted on the recording apparatus 1 in FIG. 8A.

First, the control circuit 4000 determines whether or not the waste liquid containing unit 2 is mounted to the recording apparatus 1 (step S851). When the waste liquid containing unit 2 is not mounted to the recording apparatus 1 (No in step S851), the control circuit 4000 waits for a predetermined time. When the waste liquid containing unit 2 is mounted to the recording apparatus 1 (Yes in step S851), the control circuit 4000 controls at least one of the components of the mechanical system to initialize the operation (step S852).

Next, the control circuit 4000 determines whether or not there is suspended processing (step S853). If it is determined that there is no suspended processing (No in step S853), the control circuit 4000 transitions to a standby state (step S855), and ends the processing of FIG. 8B. The standby state explained in this embodiment is a state in which the apparatus waits while performing a preliminary discharge immediately above a suction cap 132 in a cap open state and can immediately transition to the execution of recording processing or the like thereafter so that printing can be performed immediately after the power is turned on, after printing, after a recovery operation, or the like. Meanwhile if it is determined that there is suspended processing (Yes in step S853), the control circuit 4000 resumes the suspended processing (step S854), and ends the processing of FIG. 8B. This makes it possible to resume the processing that is being suspended when the waste liquid containing unit 2 is mounted again. Note that in step S854, the suspended processing may be resumed, or the suspended processing may be executed again.

Hereinafter, the detection operation at the time of execution of the recovery processing, at the time of execution of the recording processing, at the time of standby, when the cap is closed, and when the power is on will be described.

At the time of execution of the recovery processing, the ink discharge from the discharge surface 134, and the suction operation of ink from the discharge port by the suction pump 131 are performed. At this time, when the control circuit 4000 detects that the waste liquid containing unit 2 is not mounted to the recording apparatus 1, the preliminary discharge operation is immediately stopped in step S802 (step S802). Subsequently, in step S803, the operation of the carriage 15 and the suction pump 131 is stopped at determined timings during the flow of recovery processing (step S803), the recovery flag is set to on in the non-volatile memory 4004 (step S804), and the recovery processing ends in error. Therefore, the discharge surface 134 is not covered by the suction cap 132, and is in a state (cap open state) in which it is exposed to air. Thereafter, when the control circuit 4000 detects that the waste liquid containing unit 2 is mounted to the recording apparatus 1 using the waste liquid containing unit detection circuit 4005, the initialization operation of the mechanical system automatically takes place in step S852, and the standby state is entered. Thereafter, when an instruction to execute the recording processing or an instruction to execute the recovery processing is received, the recovery operation is executed following the flowchart illustrated in FIG. 9A and FIG. 9B to be described later since the recovery flag stored in the non-volatile memory 4004 is set to on. Therefore, it becomes possible to restore the discharge surface 134 (discharge port) that is exposed to air due to the operation stop to a normal state, and it becomes possible to suppress the occurrence of printing failure. Note that in one example, when the control circuit 4000 detects that the waste liquid containing unit 2 is not mounted to the recording apparatus 1 during execution of the recovery processing, the recovery processing may be suspended without error termination. In this case, when the waste liquid containing unit 2 is mounted again after being detached from the recording apparatus 1, the suspended recovery processing can be resumed started or re-executed.

In addition, when it is detected that the waste liquid containing unit 2 is not mounted to the recording apparatus 1 at the time of execution of the recording processing, the recording processing being executed is suspended in accordance with the flowchart of FIG. 8A as in the case of execution of the recovery processing, and an error state is entered. Thereafter, when it is detected that the waste liquid containing unit 2 is mounted on the recording apparatus 1 and an instruction to execute the suspended recording processing remains, the recording processing is executed again after operation initialization of the mechanical system. In this case, since the recovery flag is stored in the non-volatile memory 4004, a recovery operation to be described later is executed before the execution of the recording processing. Further, even when an instruction to execute the suspended recording processing does not remain due to the restart of the recording apparatus 1 or the like, when an instruction to execute the recording processing is received next, the recovery operation can be executed before the recording operation is executed in accordance with the recovery flag stored in the non-volatile memory 4004.

When it is detected that the waste liquid containing unit 2 is not mounted to the recording apparatus 1 during standby, the same operation as in the execution of the recovery processing is performed.

In the cap closed state, since the mounting state of the waste liquid containing unit 2 is not detected, an error does not occur. On the other hand, when operations such as the recording processing and the recovery processing are performed, since the flow illustrated in FIG. 8A and FIG. 8B for detecting the mounting state of the waste liquid containing unit 2 is started, these operation are not performed and an error occurs.

If the waste liquid containing unit 2 is not mounted when the power is turned on, an error immediately occurs, stopping the operation following the flowchart of FIG. 8A.

Next, referring to FIG. 9A and FIG. 9B, the recording processing and the recovery processing will be described in detail. The processing illustrated in FIG. 9A and FIG. 9B is realized by the control circuit 4000 deploying and executing in the RAM 4002 a program stored in the ROM 4001 or the non-volatile memory 4004.

(Recording Processing)

Figure 9A:
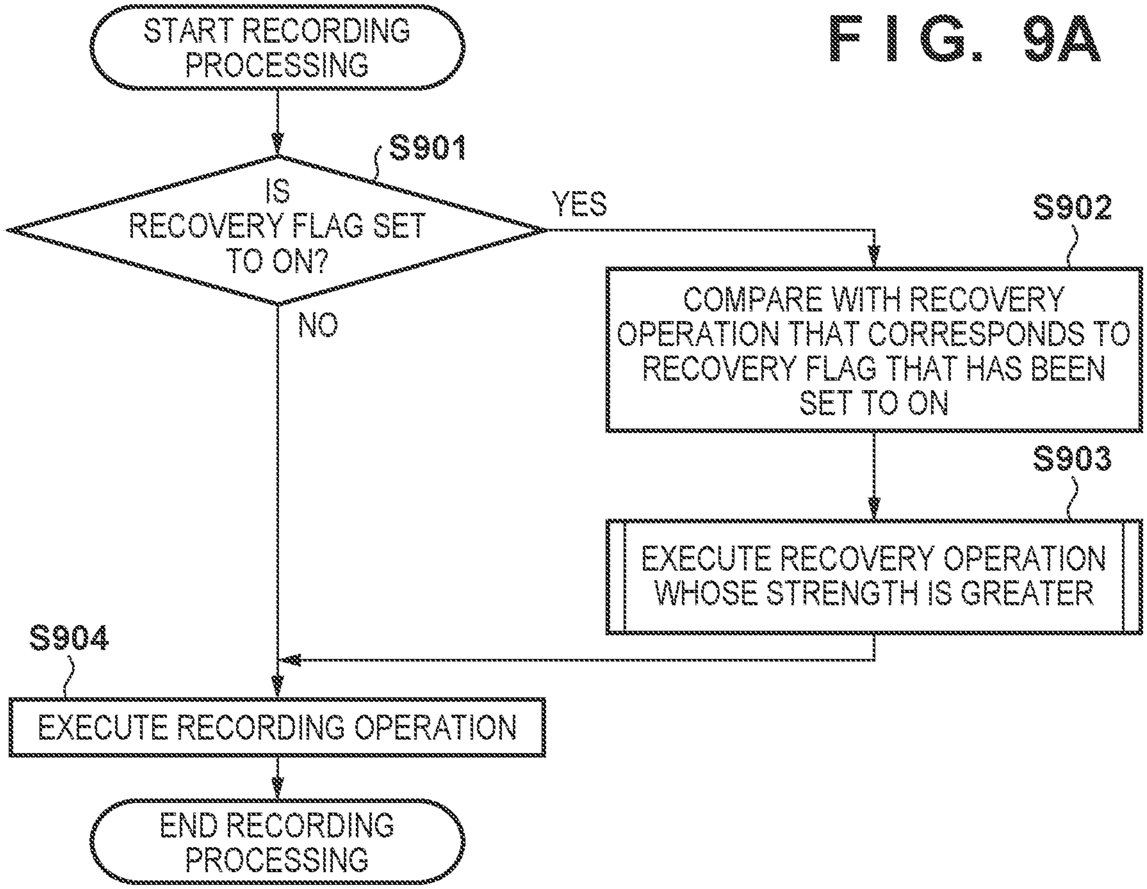
FIGS. 9A and 9B are flowcharts illustrating examples of processing of inserting/removing the waste liquid containing unit in a recovery operation according to the embodiment.
Figure 9B:
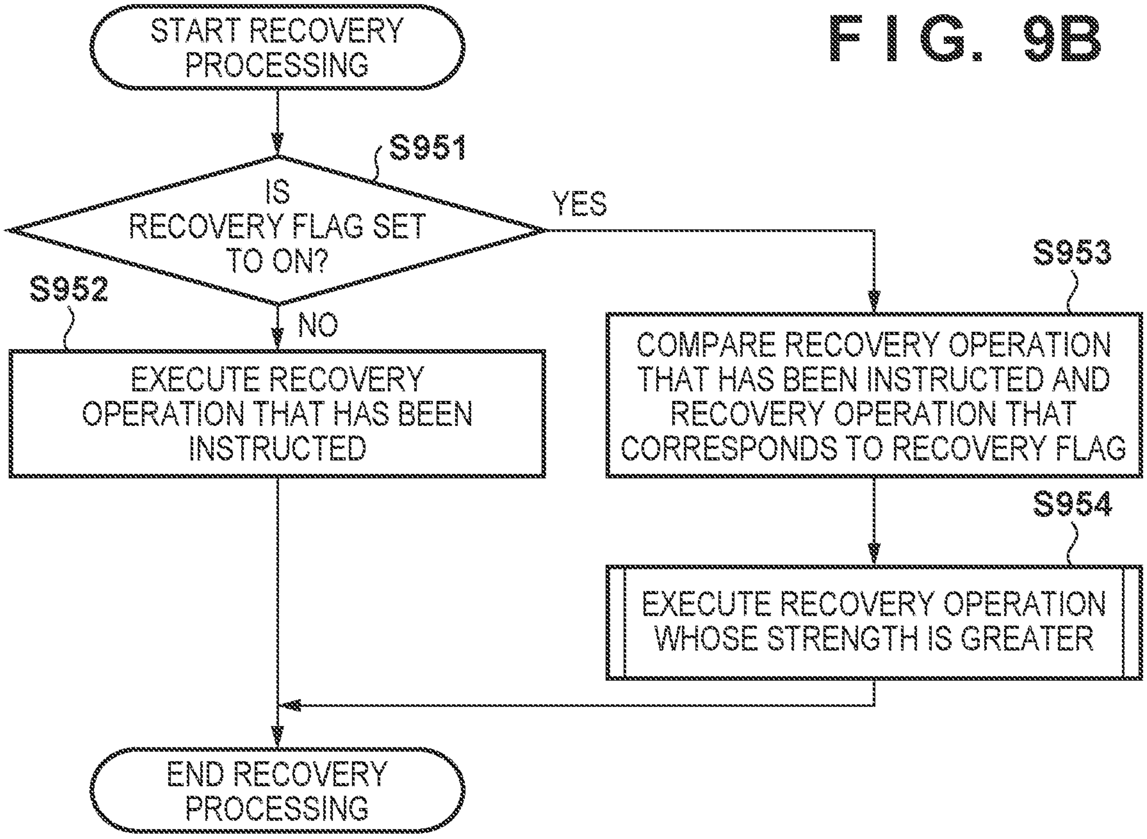

The process of FIG. 9A is executed when an instruction to execute the recording processing is received from the user or when the control circuit 4000 determines that there is recording processing that was suspended in in step S854 of FIG. 8B.

First, the control circuit 4000 determines whether the recovery flag stored in the non-volatile memory 4004 instructs an execution of the recovery operation (step S901). If the recovery flag indicates an execution of the recovery operation, that is, if it is determined that the recovery flag is ON (Yes in step S901), the processing proceeds to step S902. In step S902, the strength of the recovery operation indicated by the recovery flag that has been set to on in the flow of FIG. 8A is compared with the strength of the recovery operation indicated by the recovery flag that has been set to on by another factor. Another factor that sets the recovery flag to on includes the case where an execution of a periodic recovery operation is set or the like. Subsequently, a recovery operation whose strength is greater in the comparison in step S902 is performed (step S903), and the processing proceeds to step S904. On the other hand, when the recovery flag does not instruct an execution of the recovery operation, that is, when it is determined that the recovery flag is off (No in step S901), the control circuit 4000 executes the recording operation described above without executing the recovery operation (step S904). When the recording operation is completed, the flowchart illustrated in FIG. 9A is ended.

Thus, by executing the recovery operation of the recording head 13 before executing the recording operation, it is possible to reduce the occurrence of a discharging failure in the recording operation due to the ink solidifying in the vicinity of the discharge port of the ink or the like.

(Recovery Processing)

The processing of FIG. 9B is executed when an instruction to execute the recovery processing is received from the user.

First, the control circuit 4000 determines whether the recovery flag stored in the non-volatile memory 4004 instructs an execution of the recovery operation (step S951). When the recovery flag does not instruct an execution of the recovery operation, that is, when it is determined that the recovery flag is off (No in step S951), the control circuit 4000 executes the recovery operation that was instructed by the user (step S952), and ends the processing illustrated in FIG. 9B. When the recovery flag instructs an execution of the recovery operation, that is, when it is determined that the recovery flag is on (Yes in step S951), the control circuit 4000 compares the strength of the recovery operation that was instructed by the user and the strength of the recovery operation that the recovery flag instructs (step S953). Subsequently, a recovery operation whose strength is greater in the comparison in step S953 is performed (step S954), and the flowchart illustrated in FIG. 9B is ended. The strength of the recovery operation will be described later with reference to FIG. 10A and FIG. 10B.

As described above, by comparing the recovery operation that corresponds to the recovery flag before executing the recovery operation instructed by the user and then executing the recovery operation whose strength is greater, it is possible to prevent the recovery operation from being executed multiple times and it taking time to transition to the standby state.

(Recovery Operation)

Next, the recovery operation performed in the recording processing or the recovery processing will be described in detail with reference to FIG. 10A and FIG. 10B. The processing illustrated in FIG. 10A and FIG. 10B is realized by the control circuit 4000 deploying and executing in the RAM 4002 a program stored in the ROM 4001 or the non-volatile memory 4004.

Figure 10A:
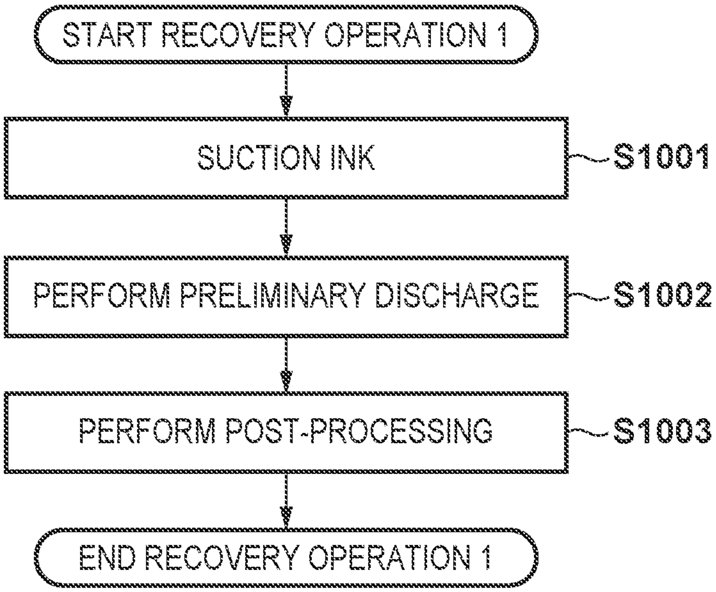
FIGS. 10A and 10B are flowcharts illustrating examples of processing of detecting the waste liquid containing unit according to the embodiment.

FIG. 10A is an example of a recovery operation (recovery operation 1) including suctioning of inks. In the recovery operation 1, the control circuit 4000 controls the suction pump 131 and suctions ink in the recording head 13 (step S1001). Here, the suction amount is not limited to a predetermined value but may be variable. For example, when the instruction of the "recovery operation 1 (strong)" is received from the user, more ink may be suctioned as compared with the case where the instruction of the "recovery operation (weak)" is received. Subsequently, the control circuit 4000 controls the recording head 13 and performs a preliminary discharge of ink (step S1002). When the recovery flag is set to ON in the non-volatile memory 4004, post-processing such as setting the recovery flag to off or erasing it is performed (step S1003).

Figure 10B:
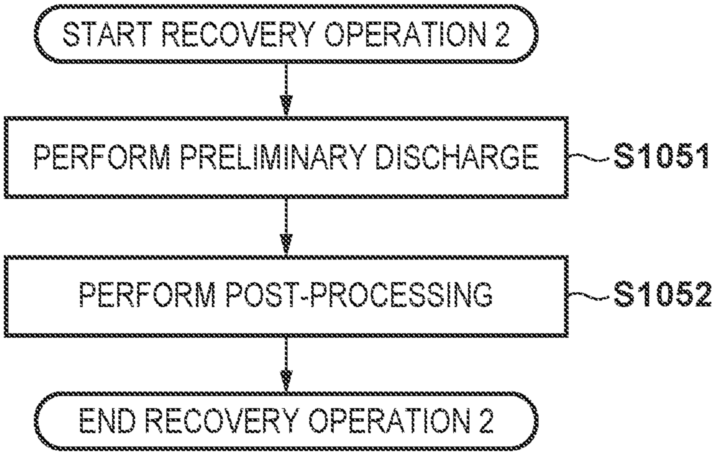

FIG. 10B is an example of a recovery operation (recovery operation 2) that does not include suctioning of inks. In the recovery operation 2, the control circuit 4000 controls the recording head 13 and performs a preliminary discharge of ink (step S1051). Then, when the recovery flag is set to ON in the non-volatile memory 4004, post-processing such as setting the recovery flag to off or erasing it is performed (step S1052).

The recovery operation 1, which includes suctioning of ink, has a greater recovery strength of the recording head 13 than the recovery operation 2, which does not include suctioning of ink. Even in the same recovery operation 1, the recovery operation 1 having a larger ink suction amount has a greater recovery strength than the recovery operation 1 having a smaller ink suction amount. Thus, in step S953 of FIG. 9B, prioritization can be performed based on at least one of the type of recovery operation and the parameters used in the recovery operation.

OTHER EMBODIMENTS

In the first embodiment, in order to prevent printing failure in the recording operation after the waste liquid containing unit 2 is detached from the recording apparatus 1, the recovery flag is stored when the waste liquid containing unit 2 is detached, so that the recovery operation is performed before execution of the recording operation after the waste liquid containing unit 2 is mounted again. However, rather than not performing the recovery until the timing at which the recovery flag is referenced, the recovery processing may be performed automatically when the waste liquid containing unit 2 is mounted on the recording apparatus 1. In this instance, the control circuit 4000 may be configured to perform a recovery operation after step S851 of FIG. 8B and prior to step S853. In this case, the recovery flag may not be referenced in the recording processing and the recovery processing of FIG. 9A and FIG. 9B. As a result, by the waste liquid containing unit 2 being detached from the recording apparatus 1, the ink that has solidified in the vicinity of the ink discharge port of the recording head 13 can be quickly removed in the cap open state. Further, in such a case, the recovery flag does not need to be stored in the non-volatile memory 4004.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-172712, filed on Oct. 13, 2020, which is hereby incorporated by reference herein in its entirety.

What is claimed is:

1. A liquid discharge apparatus comprising:

a liquid discharge unit configured to discharge liquid from one or more liquid discharge port which is arranged on a discharge surface;

a cap capable of switching between a close state in which the cap covers the discharge surface and an open state in which the cap does not cover the discharge surface;

a waste liquid containing unit configured to contain a waste liquid of the liquid;

a mount unit configured such that the waste liquid containing unit is mounted to be attached/detached; and a control unit configured to control a discharge operation of a liquid from the discharge unit, wherein the liquid discharge unit is capable of performing recording processing for discharging liquid from the one or more discharge port onto a recording medium and preliminary discharge operation for discharging liquid from the one or more discharge port to the cap, and the control unit controls based on that a state of the waste liquid containing unit has changed from a first state in which the waste liquid containing unit is mounted on the mount unit to a second state in which the waste liquid containing unit is not mounted on the mount unit during the execution of recording processing in which the discharge unit discharges liquid to recording medium, the discharging unit not to perform the preliminary discharge operation, and the control unit controls, based on that a state of the waste liquid containing unit has changed from the second state to the first state, the discharging unit to perform recovery processing including the preliminary discharge operation in order to recover the liquid discharge unit the liquid discharge apparatus to execute a first recovery operation for restoring the discharge unit.

2. The liquid discharge apparatus according to claim 1, wherein the control unit in a case where a state of the waste liquid containing unit changes from the first state to the second state while recovery processing of the discharge unit is being executed, ends the recovery processing, and in a case where an execution instruction for recording processing is received after ending the recovery processing and after a state of the waste liquid containing unit changes from the second state to the first state, controls to perform the recovery operation before executing the recording processing.

3. The liquid discharge apparatus according to claim 1, further comprising:

a suction unit configured to suction a liquid from the discharge port of the discharge unit via the cap, wherein the recovery operation further includes suctioning a liquid of a predetermined amount by the suction unit.

4. The liquid discharge apparatus according to claim 3, wherein the liquid discharge apparatus is capable of a first recovery operation in which the preliminary discharge operation is performed and a suction operation of liquid from the discharge port by the suction unit is not performed, and a second recovery operation in which both of the preliminary discharge operation and the suction operation are performed.

5. The liquid discharge apparatus according to claim 1, wherein the control unit, in a case where a state of the waste liquid containing unit changes from the first state to the second state while the cap is in the open state, controls to the liquid discharge apparatus to execute the recovery operation after receiving the instruction which is input after a state of the waste liquid containing unit changes from the second state to the first state.

6. The liquid discharge apparatus according to claim 1, further comprising:

a storage unit configured to store a recovery flag indicating whether or not to perform the recovery operation, wherein the control unit, in a case where a state of the waste liquid containing unit changes from the first state to the second state, sets the recovery flag indicating to perform the recovery operation, and controls so as to perform the recovery operation based on the recovery flag before executing the recording processing.

7. The liquid discharge apparatus according to claim 1, wherein the recording medium is a sheet, the discharge unit is a recording head that discharges a liquid onto the sheet to perform recording, and the liquid discharge apparatus further comprises an introducing member configured to introduce a liquid discharged from the recording head to the waste liquid containing unit.

8. The liquid discharge apparatus according to claim 1, further comprising a detection unit configured to detect whether the waste liquid containing unit is in the first state or the second state.

9. A control method of a liquid discharge apparatus, the apparatus comprising:

a liquid discharge unit configured to discharge liquid from one or more liquid discharge port which is arranged on a discharge surface;

a cap capable of switching between a close state in which the cap covers the discharge surface and an open state in which the cap does not cover the discharge surface;

a waste liquid containing unit configured to contain a waste liquid of the liquid; and a mount unit configured such that the waste liquid containing unit is mounted to be attached/detached, wherein the liquid discharge unit is capable of performing recording processing for discharging liquid from the one or more discharge port onto a recording medium and preliminary discharge operation for discharging liquid from the one or more discharge port to the cap, the method comprising:

in a case where a state of the waste liquid containing unit has changed from a first state in which the waste liquid containing unit is mounted on the mount unit to a second state in which the waste liquid containing unit is not mounted on the mount unit during the execution of recording processing in which the discharge unit discharges liquid to recording medium, controlling the discharging unit not to perform the preliminary discharge operation, and in a case where a state of the waste liquid containing unit has changed from the second state to the first state, controlling the discharging unit to perform recovery processing including the preliminary discharge operation in order to recover the liquid discharge unit.

* * * * *